Figure 3:
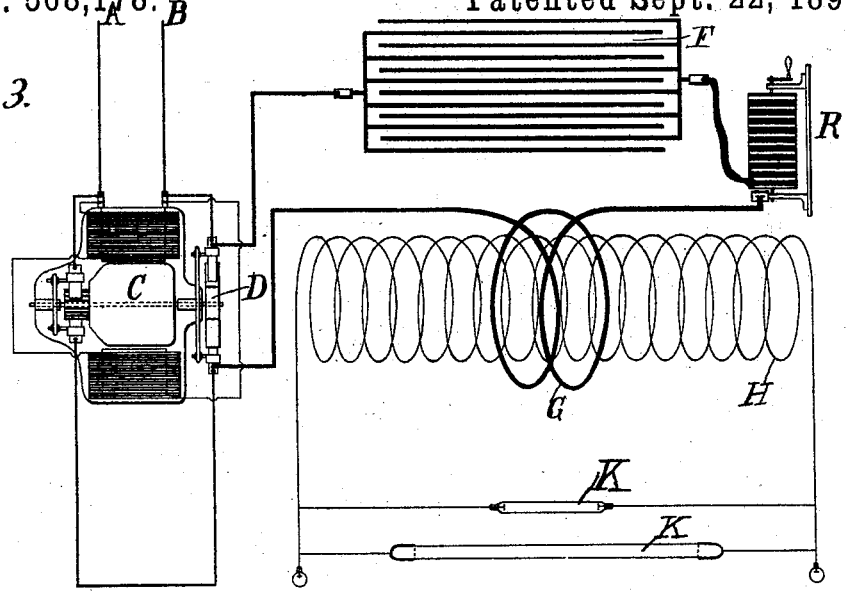

(No Model.) 2 Sheets—Sheet 1.
N. TESLA.
METHOD OF REGULATING APPARATUS FOR PRODUCING CURRENTS OF HIGH FREQUENCY.
No. 568,178. Patented Sept. 22, 1896.
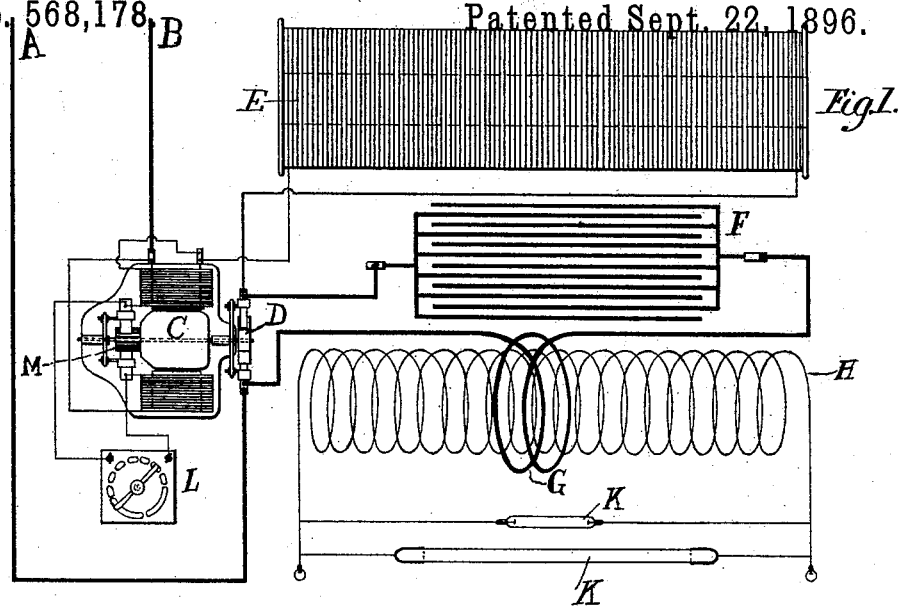
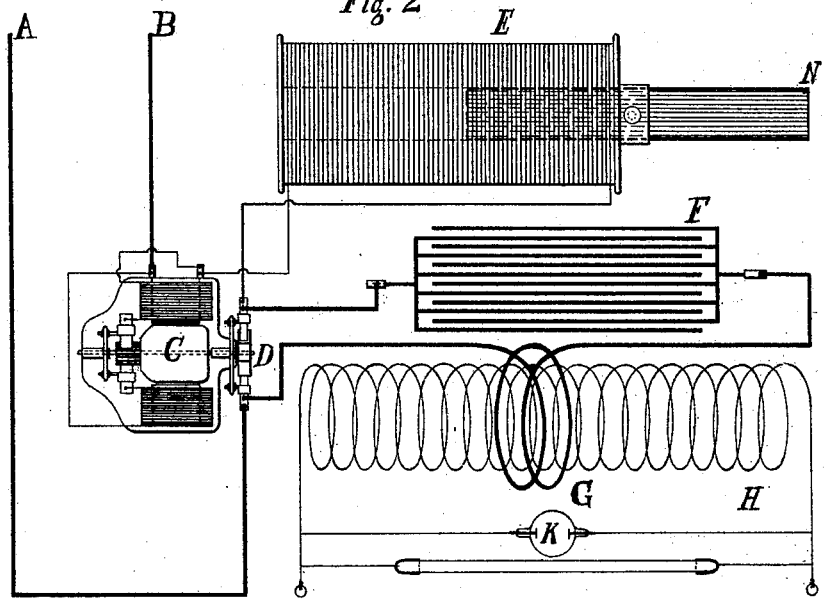
WITNESSES
Edwin B. Hopkinson
M. Lawson Dyer
INVENTOR
Nikola Tesla
BY
Kerr, Curtis & Page
ATTORNEYS (No Model.) 2 Sheets—Sheet 2.

N. TESLA.
METHOD OF REGULATING APPARATUS FOR PRODUCING CURRENTS OF HIGH FREQUENCY.

No. 568,178. Patented Sept. 22, 1896.

WITNESSES
Edwin B. Hopkinson,
M. Lawson Dyer.

INVENTOR
Nikola Tesla
BY
Kerr, Curtis & Page
ATTORNEYS

UNITED STATES PATENT OFFICE.

NIKOLA TESLA, OF NEW YORK, N. Y.

METHOD OF REGULATING APPARATUS FOR PRODUCING CURRENTS OF HIGH FREQUENCY.

SPECIFICATION forming part of Letters Patent No. 568,178, dated September 22, 1896.

Application filed June 20, 1896. Serial No. 596,262. (No model.)

*To all whom it may concern:*

Be it known that I, NIKOLA TESLA, a citizen of the United States, residing at New York, in the county and State of New York, have invented certain new and useful Improvements in Methods of Regulating Apparatus for Producing Currents of High Frequency, of which the following is a specification, reference being had to the drawings accompanying and forming a part of the same.

In previous patents and applications I have shown and described a method of and apparatus for generating electric currents of high frequency suitable for the production of various novel phenomena, such as illumination by means of vacuum-tubes, the production of ozone, Roentgen shadows, and other purposes. The special apparatus of this character which I have devised for use with circuits carrying currents in the nature of those classed as direct, or such as are generally obtainable from the ordinary circuits used in municipal systems of incandescent lighting, is based upon the following principles:

The energy of the direct-current supply is periodically directed into and stored in a circuit of relatively high self-induction, and in such form is employed to charge a condenser or circuit of capacity, which, in turn, is caused to discharge through a circuit of low self-induction containing means whereby the intermittent current of discharge is raised to the potential necessary for producing any desired effect.

Considering the conditions necessary for the attainment of these results, there will be found, as the essential elements of the system, the supply-circuit, from which the periodic impulses are obtained, and what may be regarded as the local circuits, comprising the circuit of high self-induction for charging the condenser and the circuit of low self-induction into which the condenser discharges and which itself may constitute the working circuit, or that containing the devices for utilizing the current, or may be inductively related to a secondary circuit which constitutes the working circuit proper. These several circuits, it will be understood, may be more or less interconnected; but for purposes of illustration they may be regarded as practically distinct, with a circuit-controller for alternately connecting the condenser with the circuit by which it is charged and with that into which it discharges, and with a primary of a transformer in the latter circuit having its secondary in that which contains the devices operated by the current.

To this system or combination the invention, subject of my present application, pertains, and has for its object to provide a proper and economical means of regulation therefor.

It is well known that every electric circuit, provided its ohmic resistance does not exceed certain definite limits, has a period of vibration of its own analogous to the period of vibration of a weighted spring. In order to alternately charge a given circuit of this character by periodic impulses impressed upon it and to discharge it most effectively, the frequency of the impressed impulses should bear a definite relation to the frequency of vibration possessed by the circuit itself. Moreover, for like reasons the period or vibration of the discharge-circuit should bear a similar relation to the impressed impulses or the period of the charging-circuit. When the conditions are such that the general law of harmonic vibrations is followed, the circuits are said to be in resonance or in electromagnetic synchronism, and this condition I have found in my system to be highly advantageous. Hence in practice I adjust the electrical constants of the circuits so that in normal operation this condition of resonance is approximately attained. To accomplish this, the number of impulses of current directed into the charging-circuit per unit time is made equal to the period of the charging-circuit itself, or, generally, to a harmonic thereof, and the same relations are maintained between the charging and discharge circuit. Any departure from this condition will result in a decreased output, and this fact I take advantage of in regulating such output by varying the frequencies of the impulses or vibrations in the several circuits.

Inasmuch as the period of any given circuit depends upon the relations of its resistance, self-induction, and capacity, a variation of any one or more of these may result in a variation in its period. There are therefore various ways in which the frequencies of vibration of the several circuits in the system referred to may be varied, but the most practicable and efficient ways of accomplishing the desired result are the following: (*a*) varying the rate of the impressed impulses of current, or those which are directed from the source of supply into the charging-circuit, as by varying the speed of the commutator or other circuit-controller; (*b*) varying the self-induction of the charging-circuit; (*c*) varying the self-induction or capacity of the discharge-circuit.

To regulate the output of a single circuit which has no vibration of its own by merely varying its period would evidently require, for any extended range of regulation, a very wide range of variation of period; but in the system described a very wide range of regulation of the output may be obtained by a very slight change of the frequency of one of the circuits when the above-mentioned rules are observed.

In illustration of my invention I have shown by diagrams in the accompanying drawings some of the more practicable means for carrying out the same. The figures, as stated, are diagrammatic illustrations of the system in its typical form provided with regulating devices of different specific character. These diagrams will be described in detail in their order.

In each of the figures, A B designate the conductors of a supply-circuit of continuous current; C, a motor connected therewith in any of the usual ways and driving a current-controller D, which serves to alternately close the supply-circuit through the motor or through a self-induction coil E and to connect such motor-circuit with a condenser F, the circuit of which contains a primary coil G, in proximity to which is a secondary coil H, serving as the source of supply to the working circuit, or that in which are connected up the devices K K for utilizing the current.

The circuit-controller, it may be stated, is any device which will permit of a periodic charging of the condenser F by the energy of the supply-circuit and its discharging into a circuit of low self-induction supplying directly or indirectly the translating devices. Inasmuch as the source of supply is generally of low potential, it is undesirable to charge the condenser directly therefrom, as a condenser of large capacity will in such cases be required. I therefore employ a motor of high self-induction, or in place of or in addition to such motor a choking or self-induction coil E, to store up the energy of the supply-current directed into it and to deliver it in the form of a high-potential discharge when its circuit is interrupted and connected to the terminals of the condenser.

In order to secure the greatest efficiency in a system of this kind, it is essential, as I have before stated, that the circuits, which, mainly as a matter of convenience, I have designated as the "charging" and the "discharge" circuits, should be approximately in resonance or electromagnetic synchronism. Moreover, in order to obtain the greatest output from a given apparatus of this kind, it is desirable to maintain as high a frequency as possible.

The electrical conditions, which are now well understood, having been adjusted to secure, as far as practical considerations will permit, these results, I effect the regulation of the system by adjusting its elements so as to depart in a greater or less degree from the above conditions with a corresponding variation of output. For example, as in Figure 1, I may vary the speed of the motor, and consequently of the controller, in any suitable manner, as by means of a rheostat L in a shunt to such motor or by shifting the position of the brushes on the main commutator M of the motor or otherwise. A very slight variation in this respect, by disturbing the relations between the rate of impressed impulses and the vibration of the circuit of high self-induction into which they are directed, causes a marked departure from the condition of resonance and a corresponding reduction in the amount of energy delivered by the impressed impulses to the apparatus.

A similar result may be secured by modifying any of the constants of the local circuits, as above indicated. For example, in Fig. 2 the choking-coil E is shown as provided with an adjustable core N, by the movement of which into and out of the coil the self-induction, and consequently the period of the circuit containing such coil, may be varied.

As an example of the way in which the discharge-circuit, or that into which the condenser discharges, may be modified to produce the same result I have shown in Fig. 3 an adjustable self-induction coil R in the circuit with the condenser, by the adjustment of which the period of vibration of such circuit may be changed.

Figure 4:
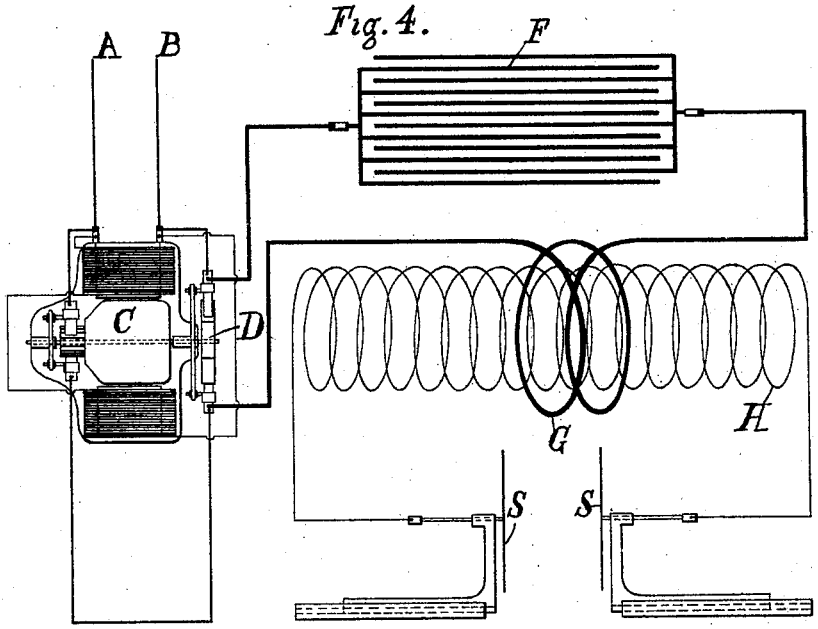

The same result would be secured by varying the capacity of the condenser; but if the condenser were of relatively large capacity this might be an objectionable plan, and a more practicable method is to employ a variable condenser in the secondary or working circuit, as shown in Fig. 4. As the potential in this circuit is raised to a high degree, a condenser of very small capacity may be employed, and if the two circuits, primary and secondary, are very intimately and closely connected the variation of capacity in the secondary is similar in its effects to the variation of the capacity of the condenser in the primary. I have illustrated as a means well adapted for this purpose two metallic plates S S, adjustable to and from each other and constituting the two armatures of the condenser.

I have confined the description herein to a source of supply of direct current, as to such the invention more particularly applies, but it will be understood that if the system be supplied by periodic impulses from any source which will effect the same results the regulation of the system may be effected by the method herein described, and this my claims are intended to include.

What I claim is—

1. The method of regulating the energy delivered by a system for the production of high-frequency currents and comprising a supply-circuit, a condenser, a circuit through which the same discharges and means for controlling the charging of the condenser by the supply-circuit and the discharging of the same, the said method consisting in varying the relations of the frequencies of the impulses in the circuits comprising the system, as set forth.

2. The method of regulating the energy delivered by a system for the production of high-frequency currents comprising a supply-circuit of direct currents, a condenser adapted to be charged by the supply-circuit and to discharge through another circuit, the said method consisting in varying the frequency of the impulses of current from the supply-circuit, as set forth.

3. The method of producing and regulating electric currents of high frequency which consists in directing impulses from a supply-circuit into a charging-circuit of high self-induction, charging a condenser by the accumulated energy of such charging-circuit, discharging the condenser through a circuit of low self-induction, raising the potential of the condenser discharge and varying the relations of the frequencies of the electrical impulses in the said circuits, as herein set forth.

NIKOLA TESLA.

Witnesses:
M. LAWSON DYER,
DRURY W. COOPER.